United States Patent [19]
Iwata

[11] 3,936,570
[45] Feb. 3, 1976

[54] TRANSFER MATERIAL

[75] Inventor: Torayoshi Iwata, Kyoto, Japan

[73] Assignee: Nissha Printing Co., Ltd., Kyoto, Japan

[22] Filed: Apr. 12, 1974

[21] Appl. No.: 460,448

[30] Foreign Application Priority Data
Apr. 19, 1973 Japan.............................. 48-46293

[52] U.S. Cl. ................ 428/349; 156/234; 156/240; 156/254; 427/148; 427/152; 428/352; 428/353; 428/354; 428/914
[51] Int. Cl.² ...................... C09J 7/02; B41M 3/12
[58] Field of Search .......... 117/3.4, 8, 45; 156/232, 156/240, 234, 238, 254; 161/406; 428/349, 352, 353, 354, 914; 427/148, 152

[56] References Cited
UNITED STATES PATENTS

| | | | |
|---|---|---|---|
| 2,954,116 | 9/1960 | Maso et al. ................. | 156/234 UX |
| 3,459,626 | 8/1969 | Morgan........................... | 117/3.4 X |
| 3,592,722 | 7/1971 | Morgan........................... | 161/406 X |
| 3,666,516 | 5/1972 | Dunning ........................ | 117/3.4 |
| 3,770,479 | 11/1973 | Dunning ........................ | 117/3.4 |
| 3,834,925 | 9/1974 | Matsumura et al................. | 117/3.4 |

FOREIGN PATENTS OR APPLICATIONS
337,074  4/1959  Switzerland.......................... 156/240

*Primary Examiner*—Harry J. Gwinnell

[57] ABSTRACT

A transfer material comprises a carrier sheet, a stripping layer releasably disposed on discrete spaced-apart portions of the upper surface of said carrier sheet, a color-containing design layer covering depressed portions formed by said stripping layer on the surface of said carrier sheet, said design layer having adequate adhesive properties with respect to said carrier sheet and to an innermost layer of a color-containing designed laminate assembly, thereby providing tearing in the thickness of said design layer in the process of transferring, layers of color-containing designed laminate assembly being adhered together, and a thoroughly coated outermost layer of said designed laminate assembly including heat sensitive adhesive materials.

4 Claims, 4 Drawing Figures

TRANSFER MATERIAL

This invention relates to a transfer material particularly capable of providing improved simulated three dimensional patterns such as a wood grain pattern.

Most commonly used art for providing simulated three dimensional patterns such as a wood grain pattern has comprised using transfer materials, wherein, by hot stamp transfer, the transferable portions including a design patterned layers have been transferred and adhered onto a receiving surface of a receiving article.

More recently, in the art concerning such transfer materials, in order to better simulate the three dimensional patterns such as a wood grain pattern, a transfer material comprising a carrier sheet coated on one surface with discrete spaced-apart portions (referred as "ticks" layer or coat in some prior art such as U.S. Pat. No. 3,666,516), which is capable of providing linearly oriented spaced-apart depressions into the receiving surface, and further particularly characterized by the surface of such a ticks layer with very low specular reflectivity, that is, being highly matted surface, has been disclosed.

As mentioned above, in order to provide a better visual three dimensional effect, generally it is desired that the transferred surface is partially depressed in desired spaced-apart portions thereof and further, the surfaces of such depressed portions have some different glossy properties or different specular reflectivity properties from other portions. While in the prior art some instances of transfer materials providing both of such depressions and such glossy properties have been disclosed, within those art it has been still difficult to provide the arbitrary, desired, transferred surface, because of the arbitrary varying, the degree of both embossment and glossy properties or specular reflectivity properties being restricted to the narrow selectivity of adequately usable constituents of the transfer materials.

In accordance with the present invention, a novel and improved transfer material capable of providing both, if desired, highly embossed partial depressions and a highly matted surface or a still lower specular reflectivity surface in correspondence with the depressed portions, has been disclosed.

It is therefore an object of the present invention to provide a novel and improved transfer material for providing simulated three dimensional patterns such as a wood grain pattern.

Another object of the present invention is to provide such a material having novel mechanism of providing an embossed surface and capable of providing an excellently simulated three dimensional patterns by a simpler printing art.

The foregoing objects of the invention and other objects will become apparent as the description proceeds.

The transfer material of the invention will be generally described with reference to the accompanying drawings wherein.

Figure 1:
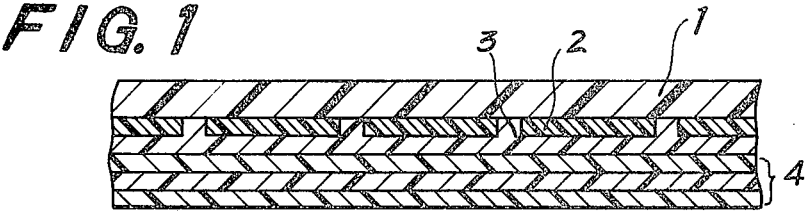
FIG. 1 is a cross-sectional schematic view of a simplified embodiment of the invention.

Firstly, a simplified instance of the invention is described below, wherein many layers are omitted for simplification. As shown in FIG. 1, a transfer material according to the present invention is provided with a carrier sheet 1 releasably associated with a stripping layer 2, which is formed on discrete spaced-apart portions of the upper surface of the said carrier sheet 1, and a color-containing design layer 3 formed on the two layers with covering both of the two or only the depressed portions, whose adhesive strength with respect both to the carrier sheet 1 and to an innermost layer, adjacent to the layer 3, of a color-containing designed laminate assembly 4 including strong adhesive resinous materials and a vehicle may be adequately stronger than that of intralayer itself, an outermost layer of the said laminate assembly 4 having adhesive ability to a receiving surface 5 of a receiving article.

By applying heat and pressure in order to transfer the desired design pattern, a releasing occurs at the contact boundaries between the carrier sheet 1 and the stripping layer 2 and furthermore the design layer 3 is torn in the thickness thereof.

Figure 2:
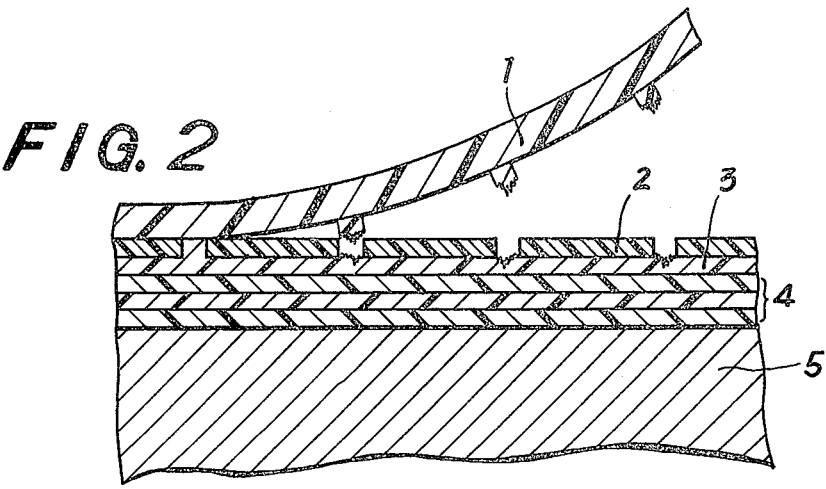
FIG. 2 is a cross-sectional schematic view of the transfer material of FIG. 1 after transferred onto a receiving surface.

After transferring, as shown in FIG. 2, the carrier sheet 1 is removed together with some parts of the design layer material, and then the discrete spaced-apart depressions having highly matted surface (low specular reflectivity surface) is formed upon the transferred surface attached to the receiving article. While the carrier sheet 1 may be any conventional carrier sheet or plastic film such as cellophane, polyethylene, polypropylene, polyester and the like, it has been found preferable for obtaining optimum results that the carrier sheet 1 is formed of a synthetic material such as treated with corona discharge or matted-surfaced polyester film.

For forming the stripping layer 2, it is necessary to select such a synthetic resinous material that, during heat transfer, it is releasable from the carrier sheet 1 and provides the desired degree of thickness to provide adhesion to the contact surface of the designed laminate assembly 4.

Then, it is the most important problem in the present invention to select a color-containing design layer material, because the adhesive properties of the material are, as previously described, to be adequately controlled. The selection of the design layer material has to be varied in combination with the materials of other layers, and such a detail will be given below.

The assembly of the designed laminate assembly 4 comprises strongly adhesive resinous materials and desired pigments.

The outermost layer of the designed laminate assembly 4 strengthen the adhesive ability of all the other layers of the assembly with respect to the receiving surface of the receiving article.

The transfer material according to the present invention has a novel and particular action of providing discrete spaced-apart depressions having highly matted surface (low specular reflectivity surface), which in the prior art may be formed by ticks layer with matted surface, differently in the present invention by the mechanism of tearing the thickness of the layer (here, the design layer 3.).

As the degree of embossed depressions and dullness of that depressed portions depend on the adhesive properties of the design layer material, it is possible to provide an arbitrary desired transferred surface, which may give any visual three dimensional effect, only with varying the adhesive properties of the design layer material.

Figure 3:
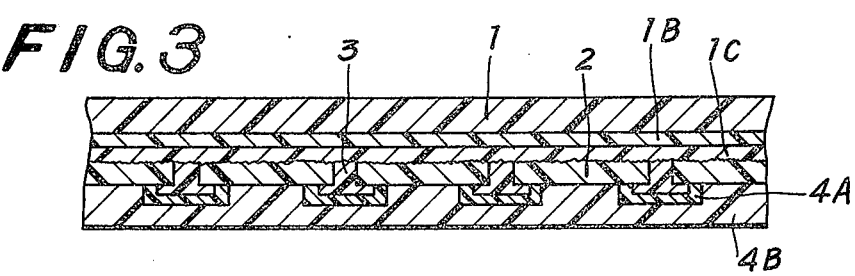
FIG. 3 is a cross-sectional schematic view of another embodiment of the invention applied to print a wood grain pattern.

Referring now to FIG. 3, a cross-sectional view of another embodiment of the present invention applied to pring a wood grain pattern, a carrier sheet 1 may be provided with a matting layer 1C, which is strongly adhered to the carrier sheet 1 by the assistance of a primer coat 1B. A stripping layer 2 then is provided on the discrete spaced-apart portions of the matting layer 1C, and overlying the matting layer 1C and the stripping layer 2 there is provided a color-containing design layer 3 and another design layer 4A respectively which are to form a vascular portion consisting of the vessel and the tracheild of the wood grain pattern and a semi-vascular portion possessing a relatively dark color, respectively, and the outermost adhesive design layer 4B.

The carrier sheet 1 comprises preferably a material such as treated with corona discharge or matted-surfaced polyester film with the thickness of about 25 microns.

The primer coat 1B comprises a binder material, which strengthens the adhesion between the carrier sheet 1 and the matting layer 1C, and it may be omitted if adhesion of the matting layer to the carrier sheet is adequate without the presence of the primer coat.

The matting layer 1C comprises a material containing matting material such as powder of silica gel or magnesium carbonate for the purpose of providing the matted-surfaced stripping layer, if desired.

The stripping layer 2 comprises a resinous material such as a chlorinated rubber, a chlorinated polypropylene, a methlmethacrylate, an AS resin and an ABS resin or a mixture of them, which is releasable during heat transfer, from the matting layer.

The design layers 3 and 4A comprise resinous materials containing desired pigments. And an adhesive power of the design layer 3 to the matting layer 1C and the upper design layer 4A need to be adequately controlled to provide tearing in the thickness of the layer during heat transfer.

The outermost adhesive design layer 4B is provided with any heat-activable resinous binder.

Figure 4:
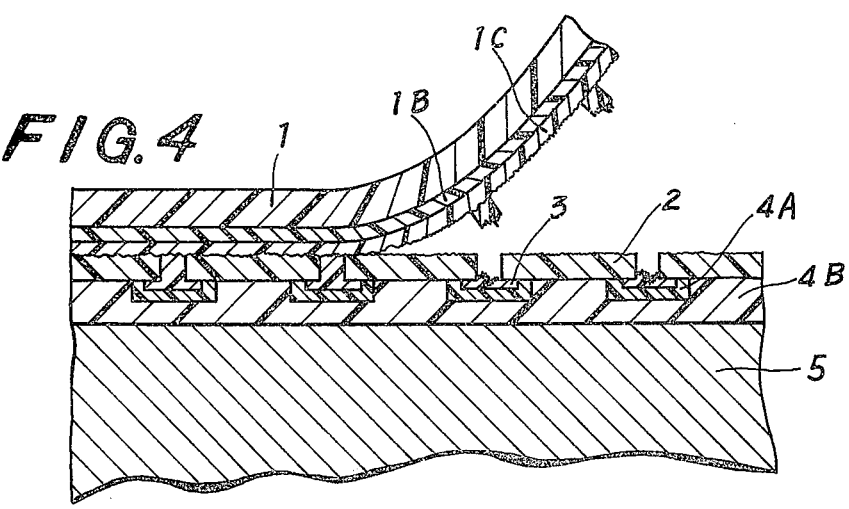
FIG. 4 is a cross-sectional schematic view of the transfer material of FIG. 3 after transferred onto a receiving surface.

After thus applying heat and pressure, the carrier sheet 1 and layers 1B and 1C attached thereto are removed, as shown in FIG. 4, and the stripping layer 2, which is released at the contact boundaries between the matting layer 1C and the stripping layer 2, remains on the receiving surface 5 together with the color-containing design layer 3, whose thickness is torn out, and the other design layers 4A and 4B having the adhesive ability to the receiving surface 5.

Then the said transfer material can provide the descrete spaced-apart depressions having highly matted surface by the mechanism of tearing the thickness of the design layer 3.

By thus varying the thickness of the color-containing design layer 3 provided can be a new type of visual three dimensional effects, which have not been disclosed in the any prior art. In this case roughness of the matting layer 1C is replicated on the outer surface of the stripping layer.

By using the said transfer material it becomes possible, more simply in the printing art, to provide a transferred surface almost the same as that of the natural wood board by representing delicate variations of color, pattern and gloss thereon.

The present invention also makes it possible to enlarge the scope of the combinations of the resins as materials, which have been restricted within narrow limits in the prior art, because of the simplicity in a printing art and the new structure of the transfer material. Most typically, the transfer material of the present invention may be used for a usual gravure printing.

If the design layer 3 of FIG. 3, whose thickness is torn out during heat transfer, is not color-containing but only comprises a transparent or semi-transparent resinous material after referred to in the art and thus hereinafter as "Protective" layer, another embodiment of the present invention is usable for providing a transferred surface with high gloss and improved mechanical strength. In this case, of course, no pigment appears on the outer transferred surface.

As previously mentioned, the combination of the layer materials has to be selected adequately to control the adhesive properties of the color-containing design layer 3 or not-color-containing protective layer 3.

The following are the examples of the resinous materials suitable for accomplishing the present invention.

(1) Resinous materials suitable for the matting layer 1-C (reffered to as layer M)

| Example | Composition | Parts by weight |
|---|---|---|
| 1 | Nitro cellulose | 20 |
| | Silica gel powder | 3 |
| | Methyl-ethyl ketone | 30 |
| | Toluene | 30 |
| | Ethyl acetate | 17 |
| 2 | Ethyl cellulose | 10 |
| | Magnesium carbonate | 3 |
| | Methanol | 40 |
| | Toluene | 47 |
| 3 | Urea-Melamine Copolymer | 10 |
| | Denatured polyamide | 30 |
| | Magnesium carbonate | 3 |
| | Xylol | 10 |
| | Methanol | 33 |
| 4 | Butane 1, 4-diol | 10 |
| | Hexamethylenediaminisocyanate | 12 |
| | Silicagel powder | 3 |
| | Ethyl acetate | 60 |
| | Toluene | 15 |
| 5 | Polyamide | 20 |
| | Magnesium carbonate | 3 |
| | Toluene | 30 |
| | Isopropyl alcohol | 30 |
| | Methanol | 17 |
| | Polyester resin | 15 |
| 6* Primercoat 1B (PR) | Nitrocellulose ½ Sec. R.S. | 15 |
| | Methyl-ethyl ketone | 30 |
| | Toluene | 30 |
| | Ethyl acetate | 8 |
| | Dinitropropane | 2 |

(2) Resinous materials suitable for the stripping layer 2 (Reffered as S), and those mentioned below are also suitable to provide the protective layer (P).

| Example | Composition | Parts by weight |
|---|---|---|
| 1 | Chlorinated rubber | 30 |
| | Toluene | 69 |
| | Polyethylene (low polymerisation degree) | 1 |
| 2 | Acrylonitrile-styrene resin | 20 |
| | Methylethyl ketone | 40 |
| | Toluene | 39 |

-continued (2) Resinous materials suitable for the stripping layer 2 (Reffered as S), and those mentioned below are also suitable to provide the protective layer (P).

| Example | Composition | Parts by weight |
|---|---|---|
|  | Polyethylene (low polymerisation degree) | 1 |
|  | Acrylonitrile-butadiene-styrene resin | 15 |
| 3 | Methylethyl ketone | 40 |
|  | Toluene | 44.7 |
|  | Polyethylene (low polymerisation degree) | 0.3 |
|  | Methyl methacrylate | 30 |
|  | Methylethyl ketone | 35 |
| 4 | Toluene | 34 |
|  | Polyethylene (low polymerisation degree) | 1 |
|  | Methylmethacrylate | 17 |
|  | Hard resin | 0.6 |
| 5 | Chlorinated rubber | 2.4 |
|  | Polyethylene (low polymerisation degree) | 0.2 |
|  | Toluene | 40 |
|  | Ethyl acetate | 29.8 |
|  | Xylol | 10 |
|  | Chlorinated polypropylene (chlorination degree 60 – 70) | 20 |
|  | Polyethylene (low polymerisation degree) | 0.3 |
| 6 | Fattyacid amide | 0.2 |
|  | Toluene | 69.5 |
|  | Xylol | 10 |

N.B.
The protective layer to be different from the stripping layer (3) Resinous materials suitable for the design layer 3 (reffered as layer D) and those mentioned below are also suitable for the layers of designed laminate assembly (AD)

| Example | Composition | Parts by weight |
|---|---|---|
|  | Chlorinated rubber | 15 |
|  | Toluene | 28 |
| 1 | Xylol | 15 |
|  | Pigment | 42 |
|  | Buthylmethacrylate | 5 |
|  | Chlorinated rubber | 10 |
| 2 | Toluene | 28 |
|  | Xylol | 15 |
|  | Pigment | 42 |
|  | Methylmethacrylate | 3 |
|  | Ethylmethacrylate | 4 |
|  | Vinyl Chloride | 8 |
| 3 | Toluene | 21 |
|  | Ethyl acetate | 21 |
|  | Pigment | 43 |
|  | Buthylmethacrylate | 15 |
|  | Toluene | 28 |
| 4 | Xylol | 15 |
|  | Pigment | 42 |
|  | Chlorinated polypropylene (chlorination degree 37–38) | 15 |
| 5 | Toluene | 43 |
|  | Pigment | 42 |

The following examples illustrate the preferable combination of layers wherein suitable resinous materials have been selected from those mentioned above.

| Layer Example | PR, | M, | S, | D or P | AD |
|---|---|---|---|---|---|
| A | 6* | 1 | 1 | any | any |
| B | 6* | 1 | 1 | one of 2-5 | any |
| C | 6* | 1 | 6 | any | any |
| D | 6* | 1 | 6 | 4 or 5 | any |
| E | 6* | 2 | 2 or 3 | any | any |
| F | 6* | 2 | 2 or 3 | one of 1,5 and 6 | any |
| G |  | 4 | one of 1,4 and 5 | any one except 5 | any |
| H |  | 4 | one of | 2 or 3 | any |
| I |  |  | 1,4 and 5 one of 1,4,5 and 6 | any | any |
| J |  |  | one of 1,4,5 and 6 |  | one of 2,3 and 6*(PR) | any |
| K |  | 5 | 4 | any | any |
| L |  | 5 | 4 |  | any one except 4 | any |
| M |  | 3 | one of 1,4 and 6 | any |  | any |
| N |  | 3 | one of 1,4 and 6 | any | 2 or 3 | any |

N.B.
Wherein, Numeral is referred to the corresponding example of previously mentioned layer materials.

Example I (wherein; S-4, D-3), G (wherein; S-4, D-3) and B (wherein; P-2) are preferably suitable for providing marble patterns, wood-grain patterns and cloth patterns, respectively.

The present invention is not restricted to simulated wood grain patterns but may be usable, simply in the printing art, to provide any desired pattern having embossed portions which vary greatly in gloss and in thickness of pigment-containing design layer or a protective layer containing no pigment.

Further embodiments and variations will be apparent to those skilled in the art and are intended to be included within the scope of the invention.

What is claimed is:

1. A transfer material comprising a carrier sheet, a stripping layer releasably disposed on discrete spaced-apart portions of the surface of said carrier sheet, a color-containing design layer adhesively secured to the portions of the surface of said carrier sheet not covered by the stripping layer and extending over adjacent portions of the stripping layer, said design layer being sufficiently adhesively secured to the carrier sheet to provide tearing of the design layer when the carrier sheet is removed from the stripping layer whereby depressions having matted surfaces are formed in the stripping layer by the torn portions of the design layer, and a laminate assembly adhesively secured to the design layer and to any portion of the stripping layer not covered by the design layer, the laminate assembly including an outermost layer of heat-sensitive adhesive adapted to be secured to a receiving article.

2. A transfer material comprising a carrier sheet, a matting layer secured to the carrier sheet, a stripping layer releasably disposed on discrete spaced-apart portions of the matting layer, a color-containing design layer adhesively secured to the portions of the matting layer not covered by the stripping layer and extending over adjacent portions of the stripping layer, said design layer being sufficiently adhesively secured to the matting layer to provide tearing of the design layer when the matting layer is removed from the stripping layer whereby depressions having matted surfaces are formed in the stripping layer by the torn portions of the design layer, and an outer layer of heat sensitive adhesive material secured to the design layer and any portion of the stripping layer not covered by the design layer.

3. The transfer material of claim 2 including a primer coat of adhesive resinous material between the carrier sheet and the matting layer.

4. A transfer material comprising a carrier sheet, a stripping layer releasably disposed on discrete spaced-apart portions of the surface of said carrier sheet, a protective layer containing no pigment adhesively secured to the portions of the surface of said carrier sheet not covered by the stripping layer and extending over adjacent portions of the stripping layer, said protective layer being sufficiently adhesively secured to the carrier sheet to provide tearing of the protective layer when the carrier sheet is removed from the stripping layer whereby depressions having matted surfaces are formed in the stripping layer by the torn portions of the protective layer, and an outer layer of heat sensitive adhesive material secured to the protective layer and any portion of the stripping layer not covered by the protective layer.

* * * * *